United States Patent
Schneider et al.

(10) Patent No.: US 6,871,870 B2
(45) Date of Patent: Mar. 29, 2005

(54) AIRBAG MODULE AND ASSEMBLY OF STEERING WHEEL AND AIRBAG MODULE

(75) Inventors: Michael Schneider, Niedernberg (DE); Matthias Helmstetter, Aschaffenburg (DE)

(73) Assignee: TRW Automotive Safety Systems GmbH, Aschaffenburg (DE)

(*) Notice: Subject to any disclaimer, the term of this patent is extended or adjusted under 35 U.S.C. 154(b) by 0 days.

(21) Appl. No.: 10/655,814

(22) Filed: Sep. 5, 2003

(65) Prior Publication Data

US 2004/0046367 A1 Mar. 11, 2004

(30) Foreign Application Priority Data

Sep. 9, 2002 (DE) ...................................... 202 13 908 U

(51) Int. Cl.$^7$ .............................................. B60R 21/16
(52) U.S. Cl. .............................. 280/728.2; 200/61.54; 200/61.55; 280/731
(58) Field of Search ............................ 280/728.2, 731; 200/61.54, 61.55

(56) References Cited

U.S. PATENT DOCUMENTS

| | | |
|---|---|---|
| 2,749,398 A | 6/1956 | Sampson |
| 5,387,008 A | 2/1995 | Lauritzen et al. |
| 5,636,865 A | 6/1997 | Riley et al. |
| 5,650,600 A | 7/1997 | Walters |
| 5,738,369 A | 4/1998 | Durrani |
| 6,079,737 A | 6/2000 | Isomura et al. |
| 6,250,666 B1 | 6/2001 | Ross |

FOREIGN PATENT DOCUMENTS

WO  WO 99/41111  8/1999

*Primary Examiner*—Eric Culbreth
(74) *Attorney, Agent, or Firm*—Tarolli, Sundheim, Covell & Tummino L.L.P.

(57) ABSTRACT

An airbag module comprising a gas generator support is distinguished in that arranged on the gas generator support (26) is a plate spring (10) which comprises a continuous ring-shaped inner section (12) and several arms (14). The arms each have a first end (14a) formed on the inner section (12) and a second, free end (14b) which is bent away axially with respect to a central axis (16) of the plate spring (10). The arms (14) are elastically deformable under axial pressure. There is further proposed an assembly comprised of a steering wheel and such airbag module.

13 Claims, 3 Drawing Sheets

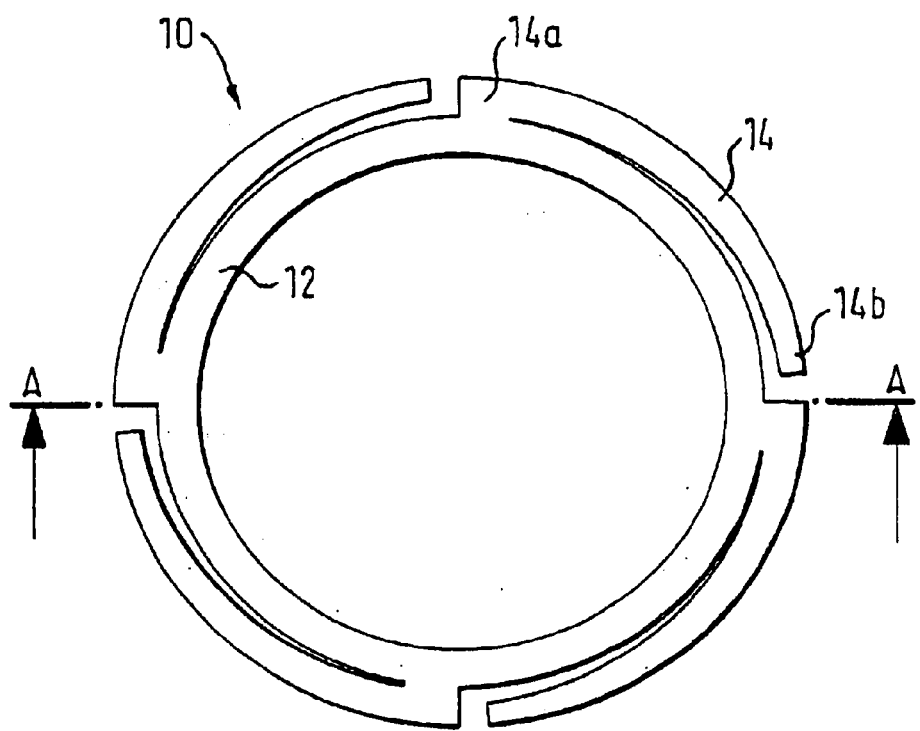
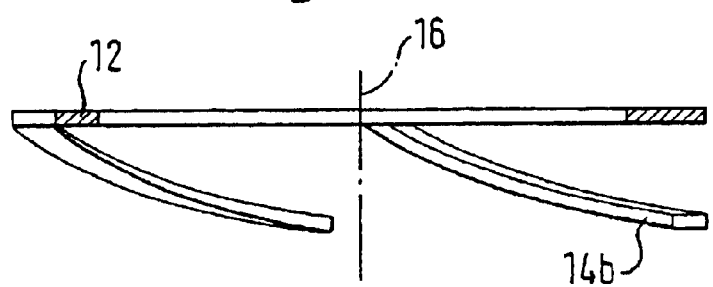

AIRBAG MODULE AND ASSEMBLY OF STEERING WHEEL AND AIRBAG MODULE

TECHNICAL FIELD

The invention relates to an airbag module with a gas generator support and also to an assembly of a steering wheel and an airbag module including such gas generator support.

BACKGROUND OF THE INVENTION

Generally, several spring elements are provided for making available a readjusting force for an airbag module which is held so as to be movable in the direction of the central axis of a steering wheel. In addition, guide elements are necessary, which permit a movement of the airbag module in axial direction, but not in radial direction. Finally, additional elements are also required to produce the horn contact. The large number of individual parts increases both the installation effort and also the installation costs.

BRIEF SUMMARY OF THE INVENTION

The invention provides an airbag module which is displaceable in the direction of the central axis of a steering wheel, the installation of the airbag module in the steering wheel requiring fewer parts and a reduced installation effort.

According to the invention, an airbag module comprising a gas generator support is distinguished in that arranged on the gas generator support is a plate spring which comprises a continuous ring-shaped inner section and several arms. The arms each have a first end connected to the inner section and a second, free end which is bent away axially with respect to a central axis of the plate spring. The arms are elastically deformable under axial pressure. The plate spring, which is easy to install, provides the necessary readjusting force alone, after the entire airbag module has been pressed down to actuate the horn.

According to a preferred embodiment of the invention, the plate spring is a stamped and bent part of sheet metal, in which the first ends of the arms are formed on at the outer periphery of the inner section. Such a plate spring can be produced in the desired form at a favorable cost. Preferably, the inner section is fastened to the gas generator support and the arms are bent away from the gas generator support, so that before installation of the airbag module according to the invention, the plate spring can already be pre-mounted thereon.

A further development of the invention makes provision that at least one contact is provided on the gas generator support, opposing at least one arm of the plate spring, which contact comes into contact with the arm through a movement of the gas generator support in the direction of the central axis of the plate spring against the resistance of the plate spring, and thus closes a circuit to trigger a horn signal. Therefore, the plate spring can also be used for establishing the horn contact and makes the installation of corresponding cooperating contacts superfluous. The airbag module according to the invention with a gas generator support made from plastic, in which the contact is embedded in the gas generator support by injection molding, proves to be particularly favorably priced and easy to install.

The invention also provides an assembly of a steering wheel and of an airbag module, the airbag module comprising a gas generator support. A plate spring is arranged between the gas generator support and the steering wheel. The plate spring comprises a continuous ring-shaped inner section and several arms which each have a first end formed on the inner section and a second, free end which is bent away in the direction of the central axis of the plate spring. The arms are elastically deformable under axial pressure. In such an assembly, the plate spring is not fastened to the gas generator support, but rather to the steering wheel, before the airbag module is then placed onto the plate spring.

In order to use the plate spring in the assembly according to the invention for triggering the horn, the arms of the plate spring, with the exception of a zone for establishing the horn contact, are electrically insulated with respect to the steering wheel, in particular by being embedded in an injection-molded plastic sheathing.

According to a further development of the invention, a counter-form corresponding to the plate spring is formed in the steering wheel, which permits a guidance in the direction of the central axis of the steering wheel. Fastening or guiding devices which would otherwise be necessary can therefore be dispensed with. The counter-form can be constructed as a slit or alternatively as an elevation.

As an alternative to fastening the plate spring to the gas generator support, in the assembly according to the invention the inner section can also be fastened to the steering wheel and the arms can be bent away from the steering wheel in the direction of the gas generator support.

BRIEF DESCRIPTION OF THE DRAWINGS

FIG. 1a shows a top view of a ring-shaped plate spring;

FIG. 1b shows a sectional view of the plate spring of FIG. 1a along the line A-A;

DETAILED DESCRIPTION OF THE PREFERRED EMBODIMENT

Figure 2:
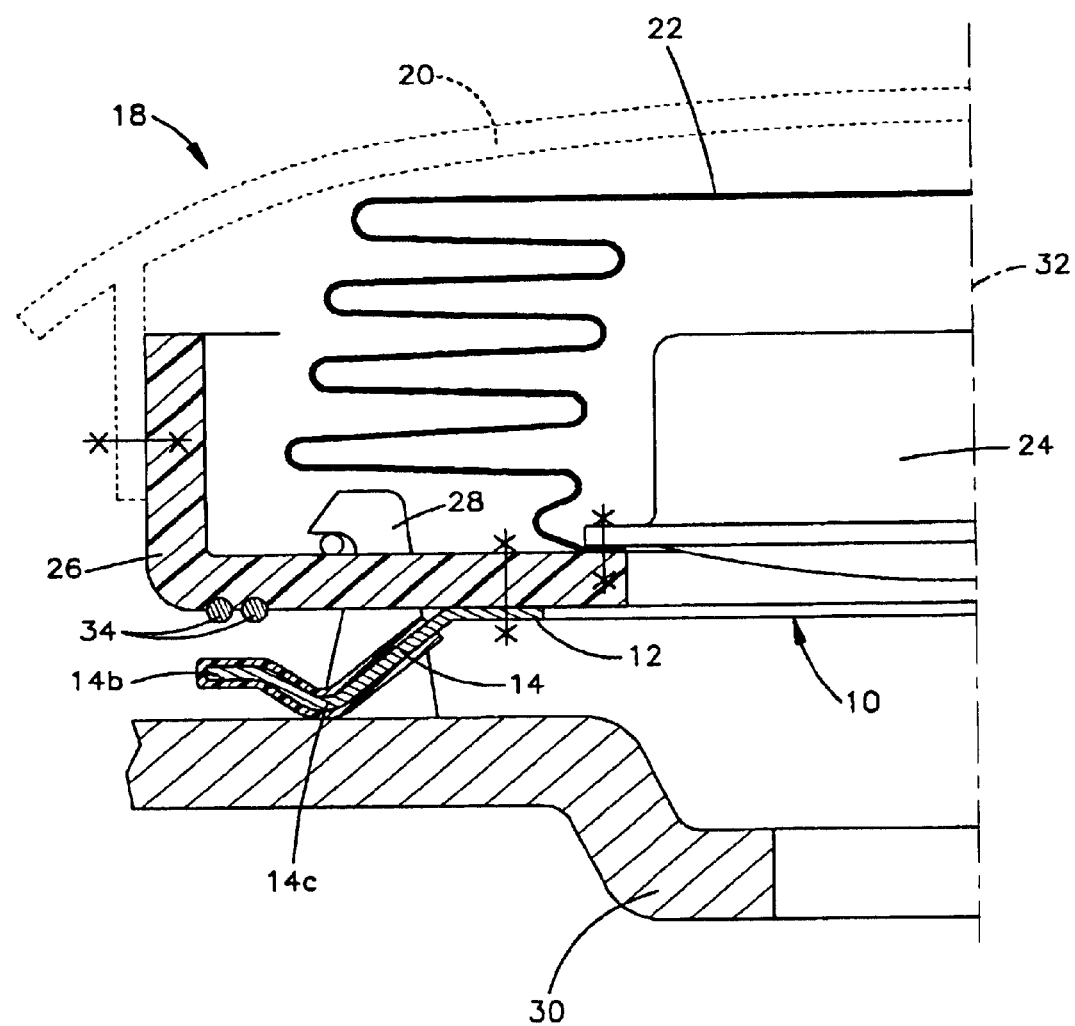
FIG. 2 shows a sectional view of a steering wheel with an airbag module according to the invention.

In FIGS. 1a and 1b a ring-shaped plate spring 10 is illustrated which, as is further described below, is installed between the gas generator support of an airbag module and a steering wheel. The plate spring 10 has a continuous ring-shaped inner section 12. Outside the inner section 12, four identical arms 14 in the shape of a partial ring are formed, which in accordance with the illustration of FIG. 1a extend tangentially along the outer periphery of the inner section 12 and each are connected at a first end 14a with the outer periphery of the inner section 12. In accordance with the illustration in FIG. 1b, the free, second ends 14b of the arms 14 are bent away axially downwards with respect to the central axis 16 of the plate spring 10. The plate spring 10 is made of sheet metal and is constructed as a stamped and bent part with preferably three or four arms 14, but fewer or more arms 14 can also be provided. The plate spring 10 is designed such that, when it rests on the bent arms 14, the arms 14 deform elastically with a downwardly-directed pressure onto the inner section 12, and provide an upwardly-directed readjusting force.

FIG. 2 shows an airbag module 18 with a covering 20, a gas bag 22, a gas generator 24 and a gas generator support 26. The airbag module 18, more precisely its gas generator support 26, is held on a steering wheel 30 by means of a conventional fastening device 28, the fastening device 28 permitting a movement of the airbag module 18 in the direction of the central axis 32 of the steering wheel 30.

Between the gas generator support 26 and steering wheel 30, a ring-shaped plate spring 10 is provided concentrically to the central axis 32 of the steering wheel 30, as was described with aid of FIGS. 1a and 1b, in which, however, the arms 14 are also bent away radially outwards. In addition, the arms 14, as can be seen from FIG. 2, are bent such that they do not rest with the free ends 14b, but rather with the bearing sections 14c on an opposite surface of the steering wheel 30, the inner section 12 of the plate spring 10 resting on the underside of the gas generator support 26 and being firmly connected therewith. On the other hand, no firm connection is provided between the arms 14 and the steering wheel 30. It is also possible to install the plate spring 10 rotated through 180°, so that the inner section 12 is fastened to the steering wheel 30.

The plate spring 10 provides for the necessary restoring force, when after pushing down of the airbag module 18 to trigger a horn signal, the airbag module 18 is to be pushed back again into its initial position shown in FIG. 2.

In the embodiment with a plastic gas generator support 26, shown in FIG. 2, the horn contact for triggering the horn signal is produced by means of the plate spring 10 itself. Metal contacts 34 are injection-molded on the gas generator support 26 opposing the free end 14b of an arm 14 of the plate spring 10. The arm 14 is bent such that, on lowering of the airbag module 18 by pressure onto the covering 20, the contacts 34 strike onto the free end 14b of the arm 14 and thus close a circuit which brings about the triggering of the horn signal. With the exception of the zone which comes in contact with the contacts 34, the arms 14 are electrically insulated with respect to the steering wheel 30, for example by being embedded in an injection-molded plastic sheathing as schematically shown in FIG. 2.

Figure 3A:
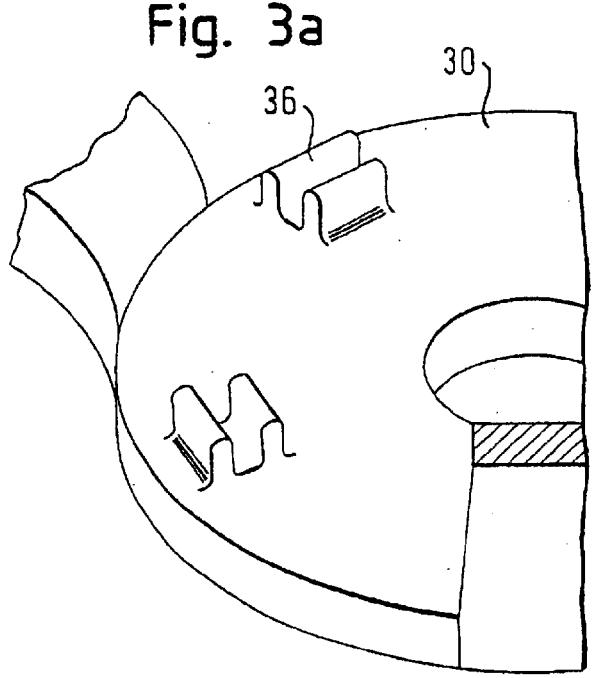
FIGS. 3a and 3b each show a perspective view of a steering wheel with a receiving means for the plate spring.
Figure 3B:
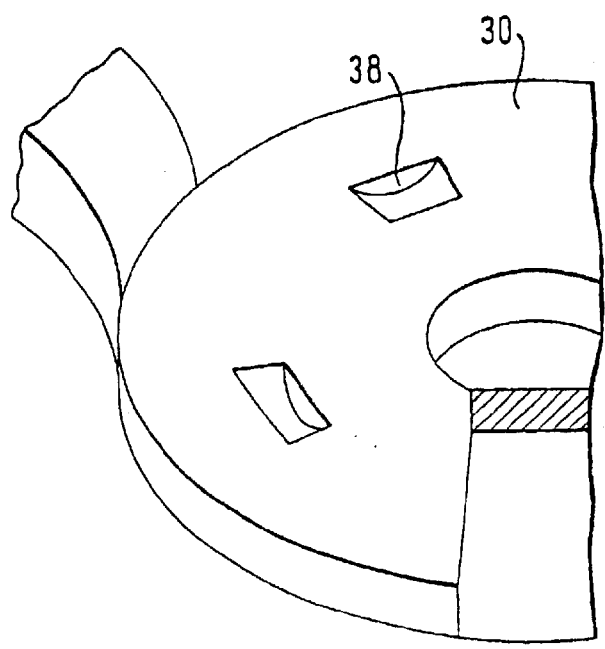

In FIGS. 3a and 3b it is indicated that a receiving means for the plate spring 10 is provided in the steering wheel 30. This receiving means can be formed, for example, by elevated zones 36 (FIG. 3a) or by depressions 38 (FIG. 3b) and permits a guidance of the plate spring 10 and hence of the entire airbag module 18 in the direction of the central axis 32 of the steering wheel 30. A movement in radial direction in relation to the central axis 32 is precluded by the form fit on the arms 14 of the plate spring 10. A locking of the plate spring 10 in the guide does not take place, because the arms 14 only have a low height in relation to their radial width.

What is claimed is:

1. An airbag module comprising a gas generator support (26), characterized in that arranged on said gas generator support (26) is a plate spring (10) which comprises a continuous ring-shaped inner section (12) and several arms (14), which each have a first end (14a) connected to said inner section (12) and a second, free end (14b) which is bent away axially with respect to a central axis (16) of said plate spring (10), said arms (14) being elastically deformable under axial pressure,
   at least one contact (34) being provided on said gas generator support (26) opposing at least one arm (14) of said plate spring (10), said contact (34) coming into contact with said arm (14) through a movement of said gas generator support (26) in an axial direction against a resistance of said plate spring (10) thereby closing a circuit to trigger a horn signal.

2. The airbag module according to claim 1, characterized in that said plate spring (10) is a stamped and bent part of sheet metal.

3. The airbag module according to claim 1, characterized in that said first ends (14a) of said arms (14) are formed on at an outer periphery of said inner section (12).

4. The airbag module according to claim 1, characterized in that said plate spring (10) comprises not fewer than three and not more than four arms (14).

5. The airbag module according to claim 1, characterized in that said inner section (12) is fastened to said gas generator support (26) and said arms (14) are bent away from said gas generator support (26).

6. The airbag module according to claim 1, characterized in that said gas generator support (26) is made from plastic and said contact (34) is embedded in said gas generator support (26) by injection-molding.

7. An assembly of a steering wheel and of an airbag module, said airbag module comprising a gas generator support, characterized in that arranged between said gas generator support (26) and said steering wheel (30) is a plate spring (10) which comprises a continuous ring-shaped inner section (12) and several arms (14) which each have a first end (14a) connected to said inner section (12) and a second, free end (14b) which is bent away in a direction of a central axis (16) of said plate spring (10), said arms (14) being elastically deformable under axial pressure.

8. The assembly according to claim 7, characterized in that said arms (14) of said plate spring (10) are substantially electrically insulated with respect to said steering wheel (30).

9. The assembly according to claim 8, characterized in that said arms (14) of said plate spring (10) are substantially electrically insulated by being embedded in an injection-molded plastic sheathing.

10. The assembly according to claim 7, characterized in that a receiving means for said plate spring (10) is provided in said steering wheel (30), which receiving means permits a guidance of said airbag module (18) in a direction of a central axis (32) of said steering wheel (30).

11. The assembly according to claim 10, characterized in that said receiving means is constructed by elevated zones (36) on a side of said steering wheel (30) facing said airbag module (18).

12. The assembly according to claim 10, characterized in that said receiving means is constructed by depressions (38) in a side of said steering wheel (30) facing said airbag module (18).

13. The assembly according to claim 7, characterized in that said inner section (12) is fastened to said steering wheel (30) and said arms (14) are bent away from said steering wheel (30) in a direction towards said gas generator support (26).

* * * * *